United States Patent
Chafle et al.

(10) Patent No.: US 9,378,511 B2
(45) Date of Patent: Jun. 28, 2016

(54) REAL-TIME APPOINTMENT OF ENTERPRISE MOBILE AGENTS IN RESPONSE TO CUSTOMER REQUESTS

(75) Inventors: Girish Bhimrao Chafle, New Delhi (IN); Dipanjan Chakraborty, Kolkata (IN); Koustuv Dasgupta, New Delhi (IN); Anant Kumar, Haryana (IN); Sumit Mittal, Uttar Pradesh (IN); Sougata Mukherjea, New Delhi (IN); Seema Nagar, Tahsil-Khanpur (IN)

(73) Assignee: International Business Machines Corporation, Armonk, NY (US)

( * ) Notice: Subject to any disclaimer, the term of this patent is extended or adjusted under 35 U.S.C. 154(b) by 907 days.

(21) Appl. No.: 12/503,241

(22) Filed: Jul. 15, 2009

(65) Prior Publication Data

US 2011/0015963 A1    Jan. 20, 2011

(51) Int. Cl.
*G06Q 10/00* (2012.01)
*G06Q 30/00* (2012.01)
*G06Q 30/02* (2012.01)
*G06Q 10/06* (2012.01)

(52) U.S. Cl.
CPC ............ *G06Q 30/0205* (2013.01); *G06Q 10/06* (2013.01); *G06Q 10/063116* (2013.01); *G06Q 30/016* (2013.01)

(58) Field of Classification Search
CPC .......... G06Q 10/06; G06Q 10/063118; G06Q 10/06398; G06Q 10/04; G06Q 10/063114; G06Q 10/063116; G06Q 10/1097; G06Q 10/06312; G06Q 10/06313; G06Q 10/06315; G06Q 10/06316; G06Q 10/0633; G06F 17/00; H04W 4/14

USPC .......... 705/7.13, 7.15, 7.16, 7.21, 7.22, 7.23, 705/7.25, 7.26, 7.27, 7.12, 7.17, 7.42; 701/300; 455/466

See application file for complete search history.

(56) References Cited

U.S. PATENT DOCUMENTS

| | | | | |
|---|---|---|---|---|
| 5,111,391 A | * | 5/1992 | Fields et al. | 705/7.14 |
| 5,122,959 A | * | 6/1992 | Nathanson et al. | 701/117 |
| 5,467,268 A | * | 11/1995 | Sisley et al. | 705/7.16 |
| 5,552,772 A | * | 9/1996 | Janky et al. | 340/573.4 |
| 5,590,269 A | * | 12/1996 | Kruse et al. | 705/7.16 |
| 5,615,121 A | * | 3/1997 | Babayev et al. | 705/7.22 |
| 5,623,404 A | * | 4/1997 | Collins et al. | 705/7.17 |
| 5,737,728 A | * | 4/1998 | Sisley et al. | 705/7.16 |
| 5,910,799 A | * | 6/1999 | Carpenter et al. | 715/866 |
| 5,913,201 A | * | 6/1999 | Kocur | 705/7.17 |

(Continued)

FOREIGN PATENT DOCUMENTS

EP    1 473 959 A1    11/2004
WO    WO 2008/102255    8/2008

OTHER PUBLICATIONS

Akkiraju et al, An Agent-Based Approach for Scheduling Multiple Machines, Applied Intelligence, 14, 135-144, 2001.*

(Continued)

*Primary Examiner* — Octavian Rotaru
(74) *Attorney, Agent, or Firm* — Ryan, Mason & Lewis, LLP (57) ABSTRACT

Techniques for enabling real-time enterprise workforce management over a telecom network are provided. The techniques include receiving real-time workforce information from one or more telecom networks, and using the real-time information for dynamic load optimization to enable real-time enterprise workforce management.

18 Claims, 4 Drawing Sheets

(56) References Cited

U.S. PATENT DOCUMENTS

| | | | |
|---|---|---|---|
| 5,920,846 A * | 7/1999 | Storch et al. | 705/7.14 |
| 5,943,652 A * | 8/1999 | Sisley et al. | 705/7.25 |
| 5,953,389 A * | 9/1999 | Pruett et al. | 379/9 |
| 5,963,911 A * | 10/1999 | Walker et al. | 705/7.12 |
| 6,078,912 A * | 6/2000 | Buerger et al. | 700/99 |
| 6,370,231 B1* | 4/2002 | Hice | 379/32.01 |
| 6,381,538 B1* | 4/2002 | Robinson et al. | 701/439 |
| 6,415,259 B1* | 7/2002 | Wolfinger et al. | 705/7.13 |
| 6,574,605 B1* | 6/2003 | Sanders et al. | 705/7.26 |
| 6,578,005 B1* | 6/2003 | Lesaint et al. | 705/7.14 |
| 6,633,900 B1* | 10/2003 | Khalessi et al. | 709/202 |
| 6,735,293 B2* | 5/2004 | Doherty et al. | 379/201.12 |
| 6,941,514 B2* | 9/2005 | Bradford | 715/700 |
| 6,985,872 B2* | 1/2006 | Benbassat et al. | 705/7.14 |
| 6,990,458 B2* | 1/2006 | Harrison et al. | 705/7.14 |
| 7,003,475 B1* | 2/2006 | Friedland et al. | 705/7.13 |
| 7,117,160 B1* | 10/2006 | Haynes et al. | 705/7.13 |
| 7,155,519 B2* | 12/2006 | Lo et al. | 709/227 |
| 7,251,612 B1* | 7/2007 | Parker et al. | 705/7.22 |
| 7,277,717 B1* | 10/2007 | Hart et al. | 455/466 |
| 7,283,971 B1* | 10/2007 | Levine et al. | 705/7.13 |
| 7,313,530 B2* | 12/2007 | Smith et al. | 705/7.24 |
| 7,346,531 B2 | 3/2008 | Jacobs | |
| 7,451,449 B2* | 11/2008 | Thompson et al. | 718/104 |
| 7,464,046 B2* | 12/2008 | Wilson et al. | 705/7.15 |
| 7,467,161 B2* | 12/2008 | Frisina | |
| 7,472,181 B2* | 12/2008 | Hollinger et al. | 709/224 |
| 7,555,440 B2* | 6/2009 | Ingman | 705/7.16 |
| 7,561,985 B2* | 7/2009 | Kanai | 702/182 |
| 7,599,793 B2* | 10/2009 | Smith et al. | 701/420 |
| 7,693,735 B2* | 4/2010 | Carmi et al. | 705/7.16 |
| 7,783,511 B2* | 8/2010 | Sridharan | 705/7.13 |
| 7,957,990 B2* | 6/2011 | Hawkins et al. | 705/29 |
| 8,046,319 B2* | 10/2011 | Satir et al. | 706/46 |
| 8,315,802 B2* | 11/2012 | Brown | 701/533 |
| 8,428,859 B2* | 4/2013 | Seltzer et al. | 340/905 |
| 8,428,990 B2* | 4/2013 | Moll et al. | 705/7.12 |
| 8,433,598 B2* | 4/2013 | Ingman et al. | 705/7.14 |
| 8,503,643 B2* | 8/2013 | McKee et al. | 379/201.01 |
| 8,548,838 B1* | 10/2013 | Ganesan | 705/7.13 |
| 2001/0027481 A1* | 10/2001 | Whyel | 709/218 |
| 2001/0037229 A1* | 11/2001 | Jacobs et al. | 705/8 |
| 2002/0010615 A1* | 1/2002 | Jacobs | 705/9 |
| 2002/0065700 A1* | 5/2002 | Powell et al. | 705/9 |
| 2002/0077876 A1* | 6/2002 | O'Meara et al. | 705/8 |
| 2002/0188513 A1* | 12/2002 | Gil et al. | 705/22 |
| 2003/0014297 A1* | 1/2003 | Kaufman et al. | 705/9 |
| 2003/0028410 A1* | 2/2003 | House et al. | 705/9 |
| 2003/0055705 A1* | 3/2003 | Kilpatrick | 705/9 |
| 2004/0044554 A1* | 3/2004 | Bull et al. | 705/8 |
| 2004/0102983 A1* | 5/2004 | Carlson et al. | 705/1 |
| 2004/0111311 A1* | 6/2004 | Ingman et al. | 705/9 |
| 2004/0111312 A1* | 6/2004 | Ingman et al. | 705/9 |
| 2004/0111313 A1* | 6/2004 | Ingman et al. | 705/9 |
| 2004/0117196 A1* | 6/2004 | Brockman et al. | 705/1 |
| 2004/0124977 A1* | 7/2004 | Biffar | 340/539.13 |
| 2004/0158762 A1* | 8/2004 | Abraham, Jr. | 714/1 |
| 2004/0162811 A1* | 8/2004 | Wetzer et al. | 707/2 |
| 2004/0190699 A1* | 9/2004 | Doherty et al. | 379/201.12 |
| 2004/0210621 A1* | 10/2004 | Antonellis | 709/200 |
| 2004/0243299 A1* | 12/2004 | Scaer et al. | 701/200 |
| 2004/0243430 A1* | 12/2004 | Horstemeyer | 705/1 |
| 2005/0015292 A1* | 1/2005 | Wilson et al. | 705/9 |
| 2005/0043986 A1* | 2/2005 | McConnell et al. | 705/1 |
| 2005/0094772 A1* | 5/2005 | Harrison et al. | 379/9.03 |
| 2005/0119930 A1* | 6/2005 | Simon | 705/9 |
| 2005/0195960 A1* | 9/2005 | Shaffer et al. | 379/265.02 |
| 2005/0267651 A1* | 12/2005 | Arango et al. | 701/3 |
| 2006/0031110 A1* | 2/2006 | Benbassat et al. | 705/9 |
| 2006/0111089 A1* | 5/2006 | Winter et al. | 455/414.1 |
| 2006/0111955 A1* | 5/2006 | Winter et al. | 705/8 |
| 2006/0235739 A1* | 10/2006 | Levis et al. | 705/9 |
| 2006/0265294 A1* | 11/2006 | de Sylva | 705/28 |
| 2006/0270421 A1* | 11/2006 | Phillips et al. | 455/457 |
| 2007/0005522 A1* | 1/2007 | Wren | 706/13 |
| 2007/0015518 A1* | 1/2007 | Winter et al. | 455/456.1 |
| 2007/0038498 A1* | 2/2007 | Powell et al. | 705/8 |
| 2007/0039001 A1* | 2/2007 | Briccarello et al. | 718/102 |
| 2007/0050221 A1* | 3/2007 | Singh et al. | 705/7 |
| 2007/0083283 A1* | 4/2007 | Ara et al. | 700/111 |
| 2007/0167168 A1* | 7/2007 | Fukamachi et al. | 455/456.1 |
| 2007/0208604 A1* | 9/2007 | Purohit et al. | 705/9 |
| 2007/0282618 A1* | 12/2007 | Barahona et al. | 705/1 |
| 2007/0299714 A1* | 12/2007 | Levine et al. | 705/9 |
| 2008/0052209 A1* | 2/2008 | Bowne et al. | 705/35 |
| 2008/0153512 A1* | 6/2008 | Kale et al. | 455/456.3 |
| 2008/0162242 A1* | 7/2008 | Schneur et al. | 705/9 |
| 2008/0270313 A1* | 10/2008 | Cullen et al. | 705/80 |
| 2008/0313005 A1* | 12/2008 | Nessland et al. | 705/9 |
| 2009/0024436 A1* | 1/2009 | Ingman et al. | 705/9 |
| 2009/0063242 A1* | 3/2009 | Shaouy | 705/9 |
| 2009/0204466 A1* | 8/2009 | Nielsen et al. | 705/9 |
| 2009/0239667 A1* | 9/2009 | Rowe et al. | 463/42 |
| 2009/0284348 A1* | 11/2009 | Pfeffer | 340/7.3 |
| 2011/0015963 A1* | 1/2011 | Chafle et al. | 705/9 |

OTHER PUBLICATIONS

Chang et al, Real-Time vehicle routing problem with Time windows and simultaneous delivery—pickup demands, Journal of Eastern Asian Society, V5, 2003 http://www.easts.info/2003journal/papers/2273.pdf.*

Cheung et al, Dynamic routing model and solution methods for fleet management with mobile technologies, Int J of Production Economics 113, 694-705, Feb. 14, 2008 http://www.lsgi.polyu.edu.hk/academic_staff/John.Shi/SCI%20journal%20Paper/22%020Dynamic%20routing%20model%20and%20solution%20methods%20for%20fleet%20management%20with%20mobile%20tech.*

Dean Stephen, Why the Closest Ambulance Cannot be Dispatched in Urban Emergency MEdical Service System, Rehispital and Disater Medicine, Apr. 2007 http://citeseerx.ist.psu.edu/viewdoc/download-?doi=10.1.1.176.647&rep=rep1&type=pdf.*

Fitzpatrick et al, Forming effective worker teams with multi-functional skill requirements, Computers and Industrial Engineering, 48, 593-608, 2005 http://ac.els-cdn.com/S0360835204002049/1-s2.0-S0360835204002049-main.pdf?_tid=dad00f58-c00b-11e3-913b-00000aacb362&acdnat=1397064470_bc570ea76d848d8652a8e7df4e4c5c68.*

Fox et al, ISIS—a knowledge based system for factory scheduling, Expert Systsms, V1, N1, Jul. 1984 http://www.eil.toronto.edu/scheduling/papers/fox-expert84.pdf http://www.ri.cmu.edu/pub_files/pub4/fox_mark_s_1984_2/fox_mark_s_1984_2.pdf.*

Fu et al, Real-Time Optimization Model for Dynamic Scheduling of Transit Operations, Transportation Research Record 1857, Paper No. 03-3697, 2003.*

Fung et al, Solving the Economic Dispatch Problem with an Integrated Parallel Genetic Algorithm, IEEE 078036338800, 2000 http://ieeexplore.ieee.org/stamp/stamp.jsp?tp=&arnumber=898150.*

Golden et al, The Vehicle Routing Problem, Latest Advances and New Challenges, ISBN 9780387777771, Jun. 26, 2008.*

Ichoua et al, Diversion Issues in Real-Time Vehicle Dispatching, Transporation Science V 34, N4, Nov. 2000 http://citeseerx.ist.psu.edu/viewdoc/summary?doi=10.1.1.205.6085.*

Ichoua et al, Exploiting Knowledge about Future Demands for Real-Time Vehicle Dispatching, Transportation Science V40, N2, May 2006 http://www.dim.uchile.cl/~tcapelle/TESIS/papersGeneracionColumnas/dynamic/soumia3_ts.pdf.*

Jung et al, Integration of GIS, GPS and optimization technologies for parcel delivery, Comp and Ind Eng 51, 2006.*

Kim et al, Wate collection vehicle routing problem with time windows, Computers and Op Research 33, 3624-3642, 2006 http://ac.els-cdn.com/S0305054805001322/1-s2.0-S0305054805001322-main.pdf?_tid=bf2b2240-c00d-11e3-86e0-00000aacb361&acdnat=1397065282_09c9d7b96ba52d56d5e44bd6d2f4c835.*

Mes et al, Comparison of agent-based scheduling to look-ahead heuristics for real-time transporation problems, European Journal of Operation Research, 181, 59-75, 2007 http://ac.els-cdn.com/S0377221706004735/1-s2.0-S0377221706004735-main.pdf?_tid=0d32b950-c002-11e3-9d55-00000aab0f6c&acdnat=1397060259_f1e51ae30e2c89b1daee9ddb2cd02b13.*

(56) References Cited

OTHER PUBLICATIONS

Montana et al, Genetic Alghorithms for Complex, Real-Time Scheduling, IEEE, 0-7803-4778-1, 1998 http://ieeexplore.ieee.org/xpls/abs_all.jsp?arnumber=724984&tag=1.*
Nexterna Clearview product, archives org, Aug. 2007 http://web.archive.org/web/20070811210853/http://www.nexterna.com/clearview/pdf/cv_dispatch.pdf.*
Oloffsson et al, Feasability Study of Field Service Force Automation in the Swedish Construction Sector, ITcon, V9, Op 285, 2004 http://citeseerx.ist.psu.edu/viewdoc/download?doi=10.1.1.142.659&rep=rep1&type=pdf.*
Peleg, A Geographic Information System Simulation Model of EMS—Reducing Ambulance Response Time, Elsevier 07356757422030005, 2004 http://ac.els-cdn.com/S0735675704000397/1-s2.0-S0735675704000397-main.pdf?_tid=757d02ea-c007-11e3-9f9e-00000aacb35d&acdnat=1397062582_2934bc6991c616230cd023310b3b70b2.*
Rubrico et al, Metaheuristic scheduling of multiple picking agents for warehouse management, Industrial Robot—an international Journal, 35-1, 58-68, Apr. 7, 2008.*
Schulze et al, A Parallel Algorithm for the Vehicle Routing Problem with Time Window Constraints, citeseerx, 1997 http://citeseerx.ist.psu.edu/viewdoc/download?doi=10.1.1.28.9751&rep=rep1&type=pdf.*
Shaw Paul, Using Constraint Programming and Local Search MEthods to Solve Vehicle Routing Problems, citeseerx, Apr. 1998 http://citeseerx.ist.psu.edu/viewdoc/download?doi=10.1.1.109.4018&rep=rep1&type=pdf.*
Solomon Marius M, Algorithms for the Vehicle Routing and Scheduling Problems with Time Window Constraints, Operations Research V35, N2, pp. 254-265, Apr. 1987 http://citeseer.ist.psu.edu/viewdoc/download;jsessionid=241F9ADDB7FF7A6942EA2120B87847E2?doi=10.1.1.124.8593&rep=rep1&type=pdf.*
Tang et al, Scheduling technicians for planned maintenance of geographically distributed equipment, Transportation Research Part E 43, 591-609, 2007 http://ac.els-cdn.com/S1366554506000329/1-s2.0-S1366554506000329-main.pdf?_tid=564ba926-c011-11e3-98b6-00000aab0f02&acdnat=1397066824_2223d895fcd8230755bd4e4c71a560cc.*
Tsang et al, Fast Local Search and Guided Local Search and Their Application to British Telecom Workforce Scheduling Problem, citeseerx, Aug. 1995 http://citeseerx.ist.psu.edu/viewdoc/download?doi=10.1.1.56.8923&rep=rep1&type=pdf.*
van Hemert et al, Dynamic Routing Problems with Fruitful Regions Models and Evolutionary Computation, LNCS Springer 3242, 692-701, Springer 2004.*
Weigel et al, Applying GIS and OR Techniques to Solve Technician-Dispatching and Home-Delivery Problems, Interfaces 29, pp. 112-130, Feb. 1999 http://www.dim.uchile.cl/~tcapelle/TESIS/MATERIAL%20C0RTES%20MAYO/papersGeneracionColumnas/dynamic/GISSears.pdf.*
Xu et al, Effective Heuristic Procedures for a Field Technician Scheduling Proble, Journal of Heuristics 7, 495-509, 2001 http://download.springer.com/static/pdf/848/art%253A10.1023%252FA%253A1011377929184.pdf?auth66=1397236959_6fca950b927ffaa8190a998a0ba52f298&ext=.pdf.*
Zeimpekis et al, Dynamic Fleet Management, ISBN 978-0-387-71721-0, 2007.*
Zweben et al, Scheduling and Rescheduling with Iterative Repair, IIE Transactions on Systems, V23, N6, Dec. 1993.*
360 Scheduling Concepts Guide 4-9-6, 360 Technologies Limited, Jul. 2008.*

* cited by examiner

REAL-TIME APPOINTMENT OF ENTERPRISE MOBILE AGENTS IN RESPONSE TO CUSTOMER REQUESTS

FIELD OF THE INVENTION

Embodiments of the invention generally relate to information technology, and, more particularly, to enterprise management.

BACKGROUND OF THE INVENTION

Existing enterprise workforce management can include a scenario such as the following example. The network at Bob's enterprise has gone off and he needs a technician immediately. Bob telephones the customer service desk, and the service desk operative uses an off-the-shelf (OTS) workforce management solution (which is integrated into the company's customer relationship management (CRM) system) to determine and confirm the availability of a suitable technician. The technician's schedule is updated on the CRM system and the technician is sent a new work request with Bob's details. Additionally, Bob receives confirmation of the job request.

However, such existing workforce management approaches have limitations. For example, there exists a sub-optimal schedule of the workforce personnel, leading to low productivity as a result of more travel time and less actual work time. Also, there can be a lack of allocation of workforce to customer requests using real-time information. Numerous calls by customers to a customer care center result in an increase in customer support cost and potentially lower customer satisfaction. Further, there exists a lack of smart alert mechanisms using real-time information (for example, location, availability) available easily at low cost from telecom service providers, as well as a lack of a consolidated real-time view of the workforce for service personnel.

Dynamic allocation of requests to service agents based on customer requests and agent's location information, therefore, is desirable. For example, if an agent is taking more time to complete the task at the customer premise due to technical complexities, his other task will get delayed.

SUMMARY OF THE INVENTION

Principles and embodiments of the invention provide techniques for real-time enterprise workforce management. An exemplary method (which may be computer-implemented) for enabling real-time enterprise workforce management over a telecom network, according to one aspect of the invention, can include steps of receiving real-time workforce information from one or more telecom networks, and using the real-time information for dynamic load optimization to enable real-time enterprise workforce management.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Principles of the invention include real-time enterprise workforce management over telecom networks. One or more embodiments of the invention include routing or re-routing a suitably skilled mobile workforce or staff (for example, a technician), who may already be on a field duty, on receipt of an immediate service request from a customer or a client.

The techniques described herein include incorporating real-time information available from telecom networks, as well as integrating with existing workforce management systems (WFMS), service delivery platforms (SDPs) while handling real-time information efficiently at the back-end (for example, intelligently poll agents' location (region-wise, based on recent movement pattern, clustering of agents, etc.). One or more embodiments of the invention can also include reusable architectural components, including design "views" that can augment an existing WFMS interface. Such views can further be augmented, for example, using telecom communication widgets (call, short message service (SMS), etc.).

The techniques detailed herein can additionally include consolidation using Web 2.0 (for example, Mash-up and AJAX). For example, a Web 2.0 Mash-up of WFMS information (for example, pending and assigned requests, agents' current workload, etc.), a geographic information service (GIS) service (for example, maps), and SDP capabilities can be used in connection with views for tracking technicians, finding nearby technicians, communication, etc.

Also, one or more embodiments of the invention utilize real-time information for dynamic load optimization to enable efficient task assignment/re-assignment policies, attendance management, as well as agent tracking. Additionally, smart alert mechanisms can be provided, while proactively handling and preventing jeopardy cases (where jeopardy is defined as a potential violation of a service level agreement (SLA) that exists between the enterprise and one or more of its customers). Further, as noted herein, existing approaches do not provide real-time workforce management with dynamic load optimization and smart alert mechanisms using real-time information available from telecom service providers.

In one or more embodiments of the invention, a workforce management system (WFMS) can include the following features and aspects. A WFMS, integrated with CRM, allows a customer service representative (CSR) to make appointments and trigger work orders upon receipt of customer calls for several different types of requests (for example, installations, repairs, un-installations, etc.).

When a CSR wants to schedule an appointment at a time preferred by the customer, available free time slots are sent to the CSR's view based on a number of items. Such items, for example, can include whether at least one agent in the desired area has a free slot in that time, average (pre-configured) travel time margins in that zip code, as well as profile and skill set of the desired agent (for example, staff, employee, technician, engineer, etc.). Agents can use, by way of example, a personal digital assistant (PDA) to track and execute their work orders. Additionally, agents can receive drip feeds (for example, of 2 work orders) and can update the state of the work order from the PDA (accepted, on-site, completed, etc).

Also, if an agent is getting delayed in finishing a work order or cannot reach the site of the next work order on-time, then jeopardy is raised, indicating a violation of service level agreements (SLAs). The supervisor of the area can have a view (for example, in the administration console) to manually inspect the work orders, talk to the particular agent or re-assign tasks.

As detailed herein, one or more embodiments of the invention include an agent finder component and capability, which can include dynamic appointment scheduling (for example, sending the next appointment to an agent based on the live location of the engineer with respect to scheduled orders in a certain area on that day). Additionally, agent finder capability can include a real-time view of live locations and current work loads of agents by CSRs, supervisors, etc. One or more embodiments of the invention also include an integrated view over a geography application (for example, GoogleMaps), covering real-time location of agents, the current work load, customer request status, communication tools (drag-and-drop) and requested scheduling. Agent finder capability can also, for example, connect to SDP to obtain live locations and enable calls, SMS, etc.

In one or more embodiments of the invention, integrating agent finder capability with the WFMS can result in a number of value adds. For example, such integration can enable a real-time view of live locations of agents and the current status of their work load (for example, on GoogleMaps) through a browser for a CSR or supervisor. This can also facilitate an ability to assign agents to tasks based on live location of agents, and/or their dynamic work load, as well as facilitate an ability to drag-and-drop "call" and "SMS" icons on a visual interface to communicate with agents and customers.

Additionally, one or more embodiments of the invention can reduce the average wait time of customers and improve customer satisfaction. Requests for immediate appointments can be made, and the ability exists to do better scheduling of appointments to agents based on live location and proximity of agents to the requested service, as well as current work load of the agent. Prescheduled requests and their assignments can be shuffled and/or optimized based on real-time views of the agent locations and their assignments.

One or more embodiments of the invention also include a trigger mechanism for WFMS, wherein a trigger can be sent to WFMS if an agent is too far from the location of the assigned task. Additionally, the techniques described herein include tracking agent location for better on-site attendance management (for example, catching a conflict when an agent is on-site according to WFMS, but located away from customer site). One or more embodiments of the invention can also handle jeopardy cases (that is, SLA violations such as, for example, an agent unable to finish job on time, an agent getting delayed, etc.) based on the live location and proximity of agents to the requested service, as well as current work load of the agent.

The techniques detailed herein can also include enabling SMS-based customer complaints and/or queries, as well as the ability to rapidly customize the application to integrate other real-time features for enterprise WFMS. For example, the trajectory of an agent can be tracked and alert can be sent when the agent goes out of a designated region. Also, one or more embodiments of the invention can include real-time monitoring of average travel times, updating travel time estimates in pin codes, and enabling feedback mechanisms (of agents) through interactive SMS (ISMS) or other telecom channels such as a phone call or simple SMS.

Figure 1:
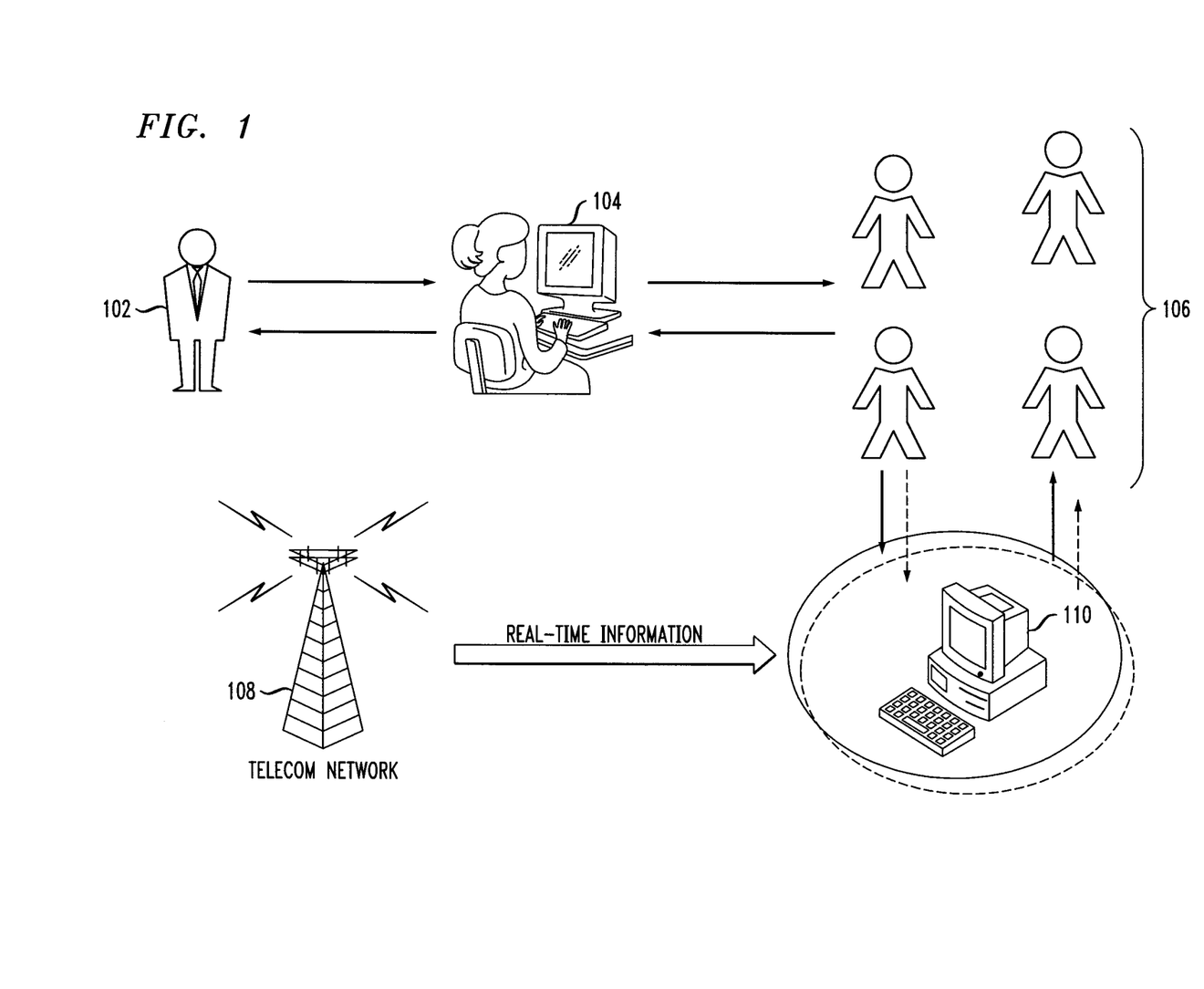
FIG. 1 is a diagram illustrating real-time enterprise workforce management, according to an embodiment of the invention.

FIG. 1 is a diagram illustrating real-time enterprise workforce management, according to an embodiment of the invention. By way of illustration, FIG. 1 depicts a customer 102, who can interact with an enterprise representative 104 (for example, a customer service representative), who can interact with agents 106. Also, FIG. 1 depicts a telecom network 108, which can provide real-time information to an enterprise system 110. The enterprise system 110 can also interact (with respect to real-time information) with the agents 106. Such information can include, for example, dynamic scheduling (based on current proximity), jeopardy cases, deviation of an agent from a specified route, agent attendance management, agents' current location, agents' route, off-hook or on-hook status, on-call duration, etc.

Figure 2:
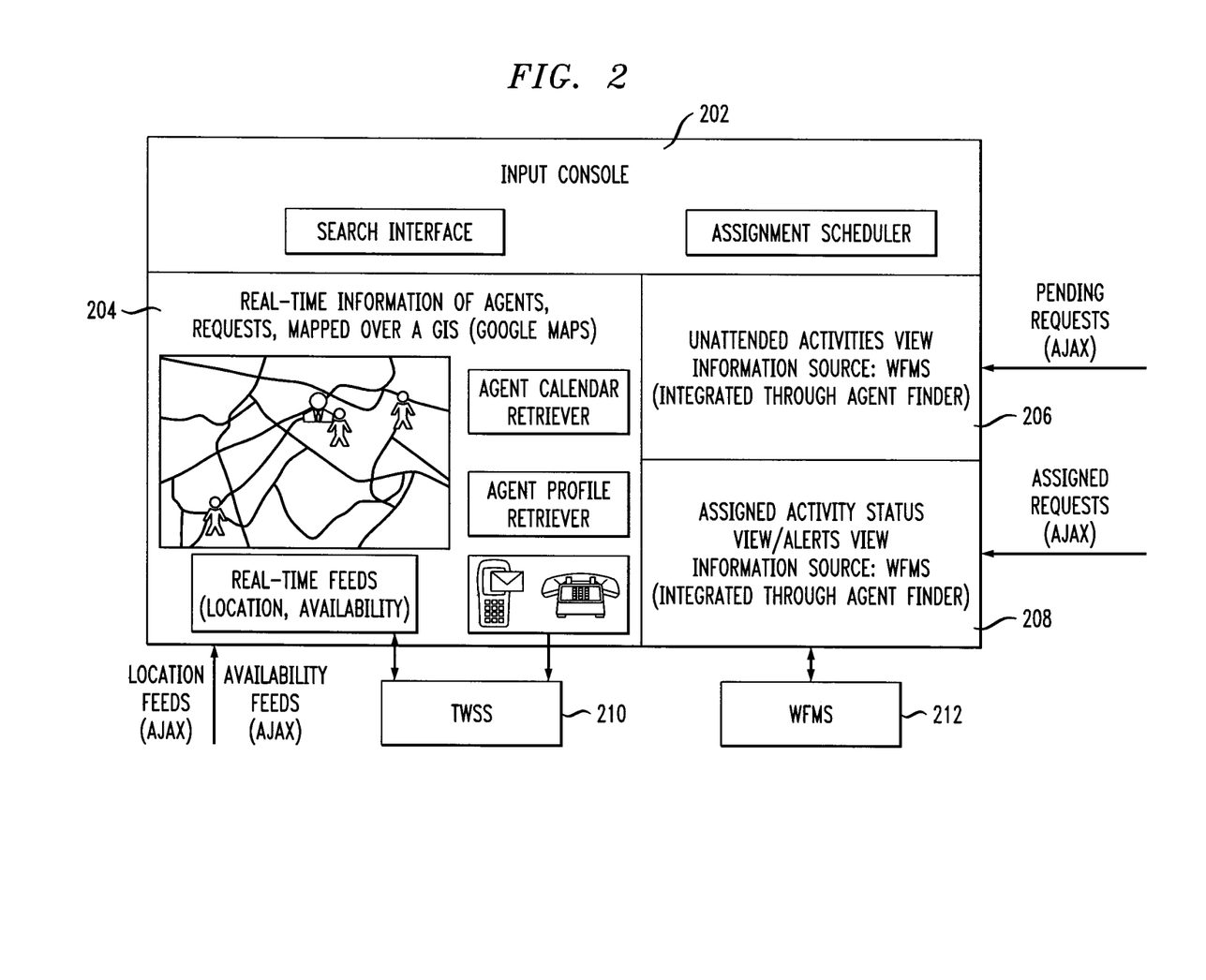
FIG. 2 is a diagram illustrating real-time workforce management architecture, according to an embodiment of the present invention.

FIG. 2 is a diagram illustrating real-time workforce management architecture, according to an embodiment of the present invention. By way of illustration, FIG. 2 depicts an input console 202 (which includes a search interface and an assignment scheduler), component 204 to receive real-time information, which can include an agent calendar retriever, an agent profile retriever, real-time feeds (for example, location feeds, availability feeds, jeopardy views, predicted jeopardy views, etc.), as well as phone and SMS capabilities. Component 204, via real-time feeds, can also interact with a telecom web services server component 210.

FIG. 2 also depicts an unattended activities view 206 (which can receive pending requests) that includes an information source of WFMS 212 integrated through an agent finder. Additionally, FIG. 2 depicts an assigned activity status view and alert view 208 (which can receive assigned requests) that includes an information source of WFMS 212 integrated through an agent finder.

Figure 3:
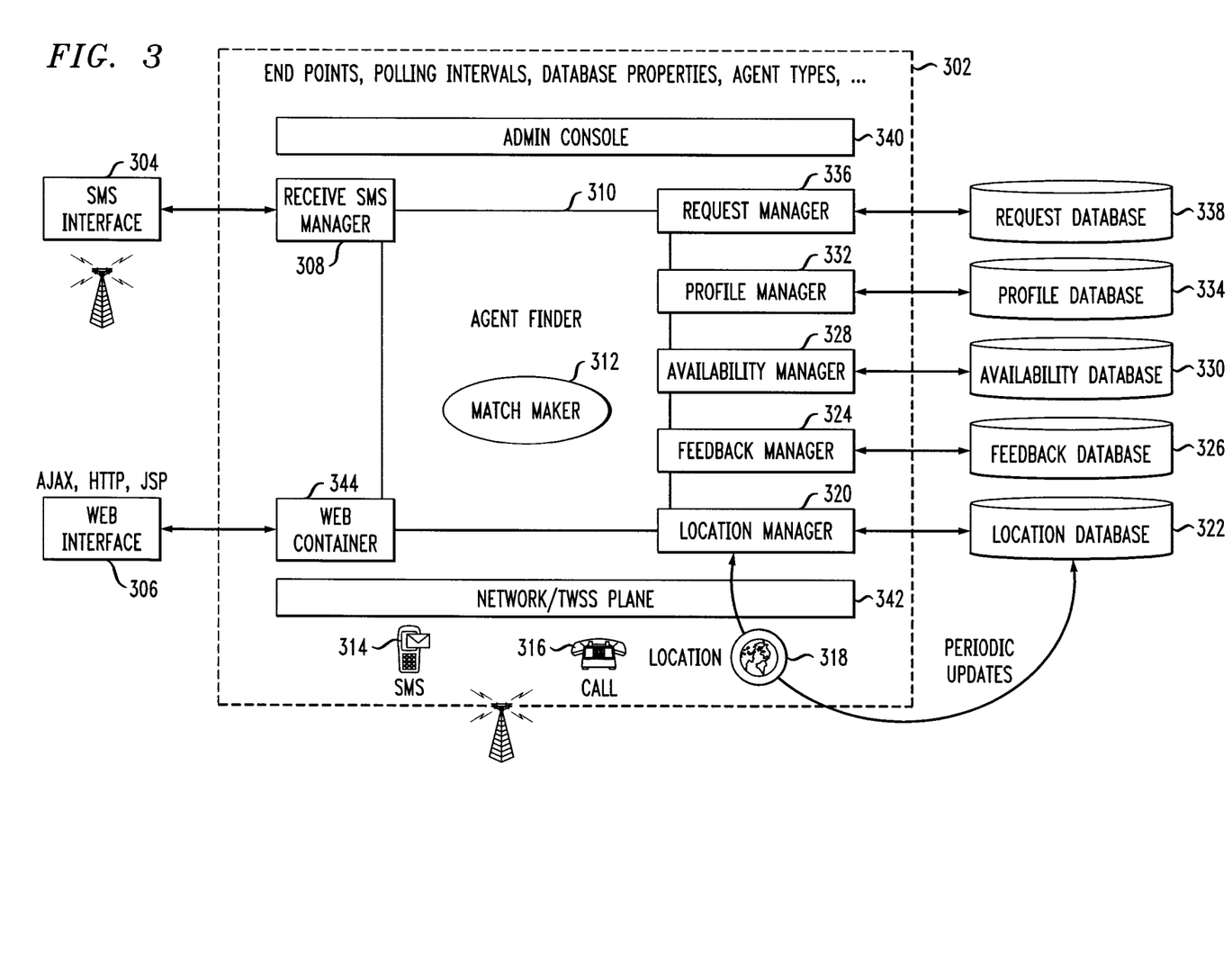
FIG. 3 is a block diagram illustrating an exemplary embodiment, according to an aspect of the invention.

FIG. 3 is a block diagram illustrating an exemplary embodiment, according to an aspect of the invention. By way of illustration, FIG. 3 depicts an agent finder framework 302, which can interact with a web interface 306 through a web container 344, and includes components such as the following. The agent finder framework 302 can include a ReceiveSMS manager component 308, which can interact with an SMS interface 304. Also, framework 302 includes an agent finder component 310 which includes a match maker component 312. FIG. 3 also depicts an administrative console 340 that can include end points, polling intervals, database properties, agent types, etc., as well as a network and/or telecom web services server (TWSS) plane 342 that includes a SMS component 314, a call component 316 and a location feed component 318.

FIG. 3 additionally depicts a location manager component 320 (which interacts with a location database 322), a feedback manager component 324 (which interacts with a feedback database 326), an availability manager component 328 (which interacts with an availability database 330), a profile manager component 332 (which interacts with a profile database 334) and a request manager component 336 (which interacts with a request database 338).

By way of illustration, the agent finder component 310, with real-time information from SDP, can be used, for example, for a "smart alert mechanism" in WFMS solutions. These alerts can be for jeopardy cases as well as for efficient assigning of technician to requests. Additionally, as noted herein, one or more embodiments of the invention can include extending existing WFMS use-case scenarios. For example, the agent finder component 310 can use real-time information about technicians (location, current task assignment, etc.) to help select or suggest technicians for unassigned tasks.

An agent finder component can also include a number of agent finder views. For example, with a technician tracker view, a supervisor enters a technician's phone number and the technician's location is displayed on the portal. Such a view can be applicable for one or multiple technicians simultaneously. With a technician finder view, a supervisor enters the customer location to find technicians within the vicinity (for example, defined by a given radius, based on live location). Additionally, with a technician trajectory view, the portal displays the path (trajectory) of a technician or agent from start to end time.

With a technician communication view, a supervisor can click on an agent finder SDP messenger, and the technicians are arranged by region with SMS and/or call icons alongside each technician. Alternatively, supervisors can drag-and-drop a communication widget (SMS/Call) on a technician icon on the map portal.

One or more embodiments of the invention can also include report generation. Such a report could include, for example, a mean distance covered by technicians, time spent by technicians in different regions, time taken by technicians to travel from one region to another, etc. Further, portal configuration can include, for example, adding workforce technicians, modifying details of technicians, deleting technicians, etc.

As also detailed herein, one or more embodiments of the invention include implementing a smart alert mechanism. By way of example, consider a scenario for proactive alerts for possible jeopardy situations. In such a scenario, a supervisor can receive an alert based on real-time information that a jeopardy situation can occur. For example, the supervisor can get an alert that the technician is far away from the customer's location and would not be able to reach on time. Additionally, such a scenario can progress in the following illustrative manner:
1. Agent accepts task.
2. <Agent Phone Number, Task Location> is sent to the agent finder (for example, by intercepting the "Accept Task" message).
3. Condition: The agent finder tracks live location of agents (for example, periodically or at some specified interval before task start-time) and checks if live location of agent is near enough to the task location (that is, if the agent can reach at the scheduled appointment time).
4. The agent finder generates an alert to send to a supervisor if this condition is not satisfied.

Also, in one or more embodiments of the invention, the agent finder allows configuration of the rules based on which location-based alerts should be generated.

Additionally, consider a scenario for proactive alerts suggesting task reassignment. In such a scenario, an agent finder suggests dynamic reassignment of tasks based on real-time information. For example, the supervisor can receive an alert to reassign a particular task to an available technician who is nearby to the task location and is more likely to reach the location at the right time. Such a scenario can progress in the following illustrative manner:
1. Agent accepts tasks.
2. Agent finder receives the task location and the phone numbers of the assigned agent.
3. Condition: If an agent assigned to an upcoming task is far from the task location, the agent finder senses a potential jeopardy and evaluates if the jeopardy can be avoided (for example, if the task is assigned to another available agent who is nearer to the task location).
4. The agent finder generates an alert to send to a supervisor suggesting the possible reassignment.

Also, in one or more embodiments of the invention, the agent finder allows configuration of the rules based on which reassignment alerts should be generated.

Consider yet another scenario for alerts suggesting a deviation of agents. In such a scenario, an agent finder tracks the route of each agent and generates an alert if there is any deviation from the designated route. Such a scenario, for example, can progress in the following illustrative manner:
1. Agent accepts tasks.
2. The agent finder receives the task location and the phone numbers of the assigned agent.
3. Condition: If an agent assigned to an upcoming task is not following the designated route, the agent finder senses a potential deviation and evaluates if it needs to be reported.
4. The agent finder generates an alert to send to a supervisor suggesting the deviation.

Also, in one or more embodiments of the invention, the agent finder allows configuration of the rules based on which deviation alerts should be generated.

Further, consider a scenario for automatic attendance management. In such a scenario, an agent finder tracks the technicians and determines if and when they have reached their designated task locations. Such a scenario, for example, can progress in the following illustrative manner:
1. Agent accepts tasks.
2. The agent finder receives the task location and the phone numbers of the assigned agent.
3. Condition: Once an agent assigned to an upcoming task reaches the task location, the agent finder senses it and decides to log it.
4. The agent finder generates a corresponding attendance message to be recorded in the WFMS system.

In one or more embodiments of the invention, the agent finder can also be used to validate the presence of a technician in a specified region.

Also, the techniques herein can additionally include extending existing WFMS use-case scenarios. By way of example, consider a scenario for augmenting a task assignment. In such a scenario, the supervisor receives and uses real-time information to help select an agent from a list generated by an existing WFMS algorithm, or to improve the algorithm itself. Such a scenario can progress in the following illustrative manner:

1. The supervisor selects a task requiring manual assignment, and displays the details.
2. The supervisor calls the customer and obtains his/her preferred time.
3. The supervisor displays the list of existing assignments of agents.
4. The supervisor decides how to rearrange the assignments to accommodate the current request.
5. The supervisor assigns the current task to the requested schedule.

Also, in one or more embodiments of the invention, a supervisor can invokes the agent finder to obtain a real-time view, including live location, availability and task assignment. The supervisor can also invoke the agent finder to obtain suggestions from the agent finder based on live location, availability and task assignment.

Additionally, consider a scenario for handling WFMS alerts. In such a scenario, a supervisor receives and uses real-time information to help handle alerts regarding jeopardy cases as well as assignment of technicians for VIP and/or urgent requests. Such a scenario can progress, for example, in the following illustrative manner:
1. WFMS sends an alert to the supervisor.
2. The supervisor displays the list of existing assignments, and reviews the possible changes.
3. The supervisor decides how to rearrange the assignments to accommodate the current request.
4. The supervisor (optionally) de-assigns an existing task.
5. The supervisor assigns the current task to the requested schedule.

In one or more embodiments of the invention, the supervisor can invoke the agent finder to obtain a real-time view, including live location, availability and task assignment. The supervisor can also invoke the agent finder to obtain suggestions from the agent finder based on live location, availability and task assignment.

Figure 4:
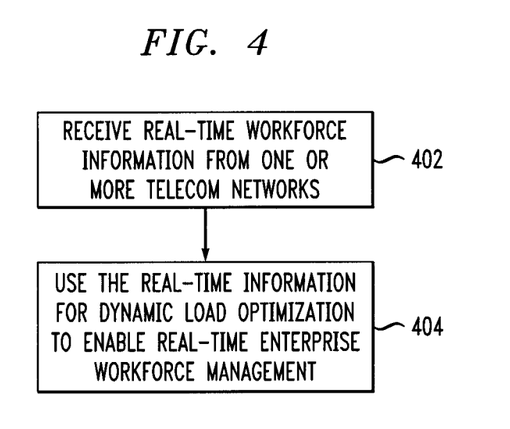
FIG. 4 is a flow diagram illustrating techniques for enabling real-time enterprise workforce management over a telecom network, according to an embodiment of the invention.

FIG. 4 is a flow diagram illustrating techniques for enabling real-time enterprise workforce management over a telecom network, according to an embodiment of the present invention. Step 402 includes receiving real-time workforce information (for example, workforce management information) from one or more telecom networks. The real-time workforce management information can include, for example, agent location, agent routes, off-hook and on-hook status of each agent, and/or on-call duration of each agent. Additionally, real-time enterprise workforce management can include, by way of example, task assignment policy, task re-assignment policy, attendance management, and agent tracking.

Step 404 includes using the real-time information for dynamic load optimization to enable real-time enterprise workforce management. Using the real-time information for dynamic load optimization to enable real-time enterprise workforce management can include integrating the real-time information with a workforce management system, a service delivery platform, and/or a customer relationship management system. Also, using the real-time information to enable real-time enterprise workforce management can include assigning a customer request for appointment to an agent based on live location and proximity to the requested service of each agent and current work load of each agent.

Also, in one or more embodiments of the invention, using the real-time information for dynamic load optimization to enable real-time enterprise workforce management includes dynamically optimizing prescheduled requests and corresponding agent assignments based on a real-time view of location and assignment of each agent. Further, using the real-time information for dynamic load optimization to enable real-time enterprise workforce management can also include managing a jeopardy case (for example, a potential violation of a SLA that exists between the enterprise and one or more customers such as an agent unable to finish job on time, an agent getting delayed, etc.) on a real-time basis via utilizing live location and proximity of each agent to a requested service and current workload of each agent.

The techniques depicted in FIG. 4 can also include triggering an alert based on the real-time information. Triggering an alert can occur, for example, upon identification of a jeopardy case, suggestion of a task reassignment, detection of a deviation of an agent from a specified route and/or detection of a deviation of an agent from a specified region.

Also, one or more embodiments of the invention can include augmenting a workforce management system with live communication capability between one or more agents and an enterprise operator. The live communication capability can include, for example, short message service (SMS) and/or call control.

The techniques depicted in FIG. 4 can also, as described herein, be run on a system, wherein the system includes distinct software modules, each of the distinct software modules being embodied on a tangible computer-readable recordable storage medium. The distinct software components can include, for example, an agent finder component, a request manager component, a profile manager component, an availability manager component, a feedback manager component, a location manager component, an administrative console component and a network component executing on a hardware processor.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 5:
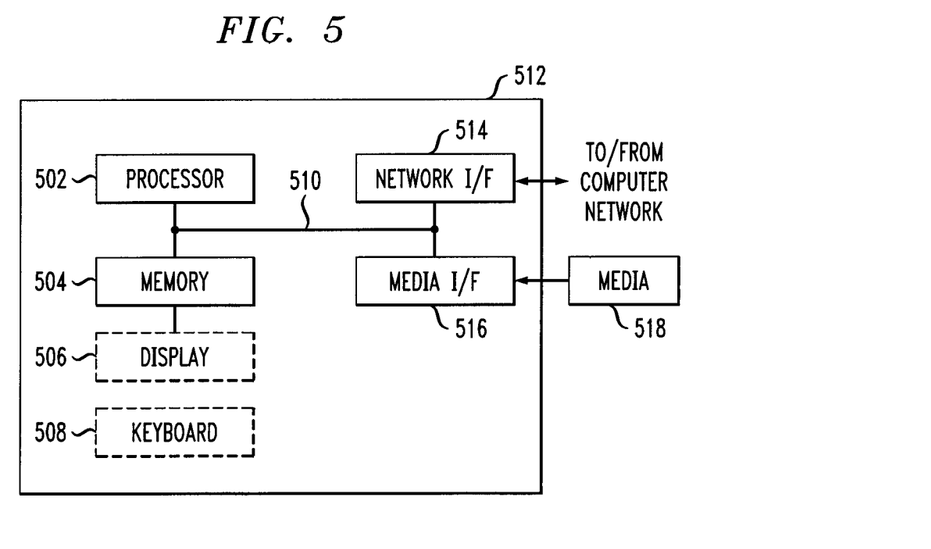
FIG. 5 is a system diagram of an exemplary computer system on which at least one embodiment of the invention can be implemented.

One or more embodiments can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

Furthermore, the invention can take the form of a computer program product accessible from a computer-usable or computer-readable medium (for example, media 518) providing program code for use by or in connection with a computer or any instruction implementation system. For the purposes of this description, a computer usable or computer readable medium can be any apparatus for use by or in connection with the instruction implementation system, apparatus, or device. The medium can store program code to implement one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 504), magnetic tape, a removable computer diskette (for example media 518), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or implementing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in FIG. 3. The method steps can then be carried out using the distinct software modules and/or sub-modules of the system, as described above, executing on a hardware processor. Further, a computer program product can include a tangible computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, utilizing real-time information for dynamic load optimization, thereby enabling efficient task assignment/re-assignment policies, attendance management as well as agent tracking.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for enabling real-time enterprise workforce management comprising:
   consolidating, a workforce management system, a map-based computer application of a real-time geographic information service, and a service delivery platform, to provide real-time information to an agent finder component;
   simultaneously tracking, using the consolidating, a plurality of field technicians which are region-clustered based on recent movement patterns;
   identifying, using the agent finder component, a first field technician, from the plurality of field technicians, who has a real-time location within a radius of a customer's location;
   communicating with said first field technician by dragging and dropping, on the map-based computer application, a short message service widget and a call widget on an icon on the map representing said first field technician;
   assigning, based on the communicating and using a hardware processor, said first field technician to the customer's location to provide a task, said task selected from a group comprising: installation, repair, and un-installation of a work order, wherein the assigning further considers an availability of said first technician, a skill set of said first technician, and an average travel time margin in the region;
   monitoring a trajectory of the first field technician before a designated start time of said task;
   generating, based on: the simultaneous tracking, the identifying, the assigning and the monitoring, an alert when the first field technician is beyond the radius of the customer's location and suggesting a reassignment of a second field technician to the task at the customer's location, wherein the second field technician is available and nearer to the customer's location than the first field technician;
   validating a presence of the second field technician once arrived at the customer's location; and
   generating, using the hardware processor, a report comprising: a mean distance covered by the first technician and the second technician, a first time spent by the first technician and the second technician in different regions, and a second time taken by the first technician and the second technician to travel from the different regions.

2. The method of claim 1, wherein the real-time information comprises at least one of off-hook and on-hook status of each of the multiple agents of the enterprise, and on-call duration of each of the multiple agents of the enterprise.

3. The method of claim 1, wherein the real-time enterprise workforce management comprises at least one of task assignment policy, task re-assignment policy, attendance management, and tracking of the multiple agents of the enterprise.

4. The method of claim 1, wherein said assigning comprises assigning based on current work load of each of the plurality of field technicians.

5. The method of claim 1, wherein said assigning comprises assigning multiple of the plurality of field technicians.

6. The method of claim 1, wherein generating an alert further comprises generating an alert upon suggestion of a task reassignment.

7. The method of claim 1, wherein generating an alert further comprises generating an alert upon detection of a deviation of a given one of the plurality of field technicians from a specified route.

8. The method of claim 1, wherein generating an alert further comprises generating an alert upon detection of a deviation of a given one of the plurality of field technicians from a specified region.

9. A non-transitory computer readable storage medium for enabling real-time enterprise workforce management, on which is recorded computer executable instructions that, when executed by a processor, cause the processor to execute steps of a method comprising:
   consolidating, a workforce management system, a map-based computer application of a real-time geographic information service, and a service delivery platform, to provide real-time information to an agent finder component;
   simultaneously tracking, using the consolidating, a plurality of field technicians which are region-clustered based on recent movement patterns;

identifying, using the agent finder component, a first field technician, from the plurality of field technicians, who has a real-time location within a radius of a customer's location;

communicating with said first field technician by dragging and dropping, on the map-based computer application, a short message service widget and a call widget on an icon on the map representing said first field technician;

assigning, based on the communicating and using the processor, said first field technician to the customer's location to provide a task, said task selected from a group comprising: installation, repair, and un-installation of a work order, wherein the assigning further considers an availability of said first technician, a skill set of said first technician, and an average travel time margin in the region;

monitoring a trajectory of the first field technician before a designated start time of said task;

generating, based on: the simultaneous tracking, the identifying, the assigning and the monitoring, an alert when the first field technician is beyond the radius of the customer's location and suggesting a reassignment of a second field technician to the task at the customer's location, wherein the second field technician is available and nearer to the customer's location than the first field technician;

validating a presence of the second field technician once arrived at the customer's location; and generating, using the processor, a report comprising: a mean distance covered by the first technician and the second technician, a first time spent by the first technician and the second technician in different regions, and a second time taken by the first technician and the second technician to travel from the different regions.

10. The computer readable storage medium of claim 9, wherein the real-time information comprises at least one of off-hook and on-hook status of each of the multiple agents of the enterprise, and on-call duration of each of the multiple agents of the enterprise.

11. The computer readable storage medium of claim 9, wherein the real-time enterprise workforce management comprises at least one of task assignment policy, task re-assignment policy, attendance management, and tracking of the multiple agents of the enterprise.

12. The computer readable storage medium of claim 9, wherein said assigning comprises assigning based on current work load of each of the plurality of field technicians.

13. The computer readable storage medium of claim 9, wherein said assigning comprises assigning multiple of the plurality of field technicians.

14. A system for enabling real-time enterprise workforce management, the system comprising:

a memory; and at least one processor coupled to the memory and configured for:

consolidating, a workforce management system, a map-based computer application of a real-time geographic information service, and a service delivery platform, to provide real-time information to an agent finder component;

simultaneously tracking, using the consolidating, a plurality of field technicians which are region-clustered based on recent movement patterns;

identifying, using the agent finder component, a first field technician, from the plurality of field technicians, who has a real-time location within a radius of a customer's location;

communicating with said first field technician by dragging and dropping, on the map-based computer application, a short message service widget and a call widget on an icon on the map representing said first field technician;

assigning, based on the communicating and using the at least one processor, said first field technician to the customer's location to provide a task, said task selected from a group comprising: installation, repair, and un-installation of a work order, wherein the assigning further considers an availability of said first technician, a skill set of said first technician, and an average travel time margin in the region;

monitoring a trajectory of the first field technician before a designated start time of said task;

generating, based on: the simultaneous tracking, the identifying, the assigning and the monitoring, an alert when the first field technician is beyond the radius of the customer's location and suggesting a reassignment of a second field technician to the task at the customer's location, wherein the second field technician is available and nearer to the customer's location than the first field technician;

validating a presence of the second field technician once arrived at the customer's location; and generating, using the at least one processor, a report comprising: a mean distance covered by the first technician and the second technician, a first time spent by the first technician and the second technician in different regions, and a second time taken by the first technician and the second technician to travel from the different regions.

15. The system of claim 14, wherein the real-time information comprises at least one of off-hook and on-hook status of each of the multiple agents of the enterprise, and on-call duration of each of the multiple agents of the enterprise.

16. The system of claim 14, wherein the real-time enterprise workforce management comprises at least one of task assignment policy, task re-assignment policy, attendance management, and tracking of the multiple agents of the enterprise.

17. The system of claim 14, wherein said assigning comprises assigning based on current work load of each of the plurality of field technicians.

18. The system of claim 14, wherein said assigning comprises assigning multiple of the plurality of field technicians.

* * * * *